US005092570A

United States Patent [19]

Depping

[11] Patent Number: 5,092,570

[45] Date of Patent: Mar. 3, 1992

[54] VERTICAL VISE WITH FOLDING SAWHORSE SUPPORT

[76] Inventor: James W. Depping, 12 Eddie Dr., Box 232, Smithton, Ill. 62285

[21] Appl. No.: 657,536

[22] Filed: Feb. 19, 1991

[51] Int. Cl.[5] .......... B23Q 3/00

[52] U.S. Cl. .......... 269/296; 269/901; 269/139; 269/253

[58] Field of Search .......... 269/139, 296, 901, 253, 269/246

[56] References Cited

U.S. PATENT DOCUMENTS

| | | | |
|---|---|---|---|
| 741,562 | 10/1903 | Soety | 269/901 |
| 1,479,209 | 1/1924 | Topp | 269/901 |
| 3,139,277 | 6/1964 | Mears | 269/296 |
| 3,734,235 | 5/1973 | Lanier | 269/296 |
| 4,579,322 | 4/1986 | Schwarz | 269/296 |

*Primary Examiner*—J. J. Hartman

*Attorney, Agent, or Firm*—Robbins & Robbins

[57] ABSTRACT

A vertically adjustable vise having a collapsible sawhorse support is provided. The vise is mounted such that the opposing clamp faces are horizontally disposed and approach each other vertically. The vertically mounted vise can accommodate wider boards, and holds the boards in a horizontal position such that they are easier to cut with a saw. The sawhorse support is readily collapsible to a more compact, substantially flat configuration by disengaging braces, allowing for efficient storage, such as by hanging on a wall.

8 Claims, 2 Drawing Sheets

VERTICAL VISE WITH FOLDING SAWHORSE SUPPORT

BACKGROUND OF THE INVENTION

There exist several types of table-mounted clamping devices which can be used for a variety of jobs, such as sawing boards and the like. Many of these employ vises having clamp faces which move relatively to the vertical plane such that the clamped object is held in a vertical position. On occasion, however, it is desirable to perform work on the clamped object while it is held in a horizontal position. Wide boards, for instance, are difficult to cut with a manual or hand-held power saw when the boards are disposed upright, rather than lying horizontally. Other operations, such as drilling holes into or painting an item, may be performed more comfortably, as well, when the work object lies flat.

Accordingly, there is a distinct need for a portable vise mounted such that work objects may be positioned and held flat in the vertical plane. Additionally, it is desirable that such portable vise be readily collapsible for easy storage.

SUMMARY OF THE INVENTION

By means of the instant invention there has been provided a portable vise which enables the operator to clamp and hold work objects in the horizontal plane, while providing a sawhorse-type mount which is easily collapsible for efficient storage.

The portable vise of the invention is comprised of a conventional vise mounted such that the opposing clamp faces approach each other and move relative to the vertical plane. The vise is mounted to a cross-support which is hingedly and pivotally attached to four support legs. The support legs can pivot out in a splayed manner when the sawhorse is erected and can pivot in for a reduced overall size to a substantially flat configuration for easy portability when broken down for storage.

The support legs are stabilized when erected by the use of brace members which span between the respective support legs. These brace members are easily connected when the sawhorse is erected and can be quickly disconnected before storage.

It is therefore an object of the invention to provide a vise for clamping work objects so that they may be disposed in the horizontal plane for ease and efficiency in carrying out the particular job thereon.

It is a further object of the invention to mount said vise on a sawhorse to provide a portable work station which can be set up anywhere using a minimum amount of space.

It is still further an object of the invention to provide a sawhorse mount for said vise which is easily collapsible by disengaging braces, whereby the leg supports may be repositioned to reduce the sawhorse to a more compact size and substantially flat configuration preparatory to storage.

The above features are objects of this invention. Further objects will appear in the detailed description which follows and will be otherwise apparent to those skilled in the art.

For purpose of illustration of this invention a preferred embodiment is shown and described hereinbelow in the accompanying drawing. It is to be understood that this is for the purpose of example only and that the invention is not limited thereto.

IN THE DRAWINGS

DESCRIPTION OF THE INVENTION

Figure 1:
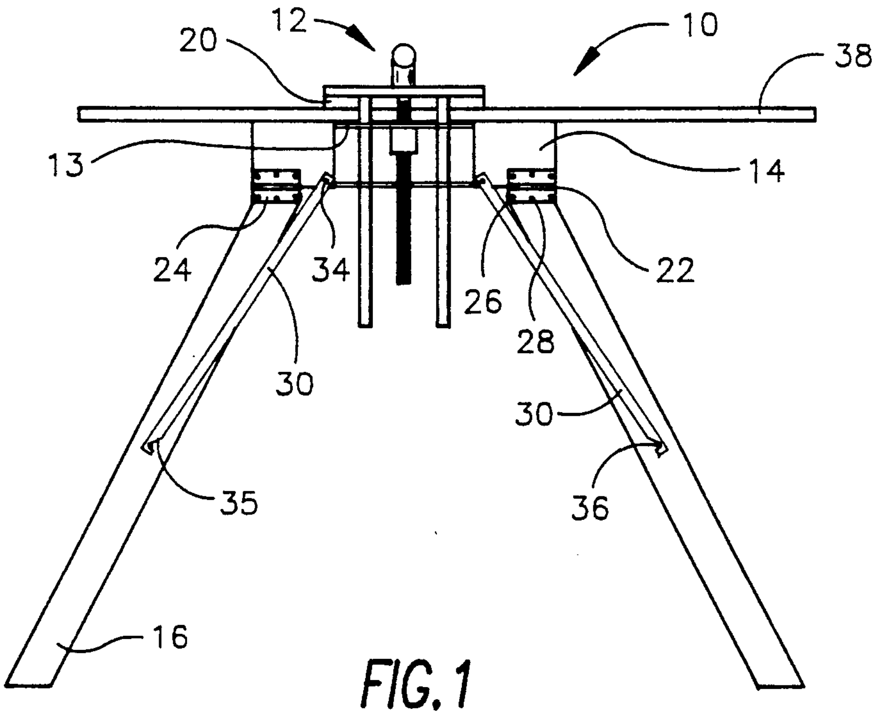
FIG. 1 is a view in side elevation from the rear of the sawhorse support.

The horizontal vise with folding sawhorse support of the instant invention is generally indicated by the reference numeral 10, and is comprised of vise 12 supported on cross support member 14 having four leg members 16.

Vise 12 is conventional and is of the type having a clamp face approach or move away from a base surface 13 as the user turns handle 18. Vise 12 is mounted so that clamp face 20 moves vertically relatively to the horizontal plane, i.e., up and down. Vise 12 is mounted to the rear of support member 14 by bolting thereto or by other conventional means. Support member 14 may be comprised of a 4 inch by 4 inch section of wood, or other appropriate material, for sturdiness. It serves not only to support the vise and legs, but also provides a wide rest surface for boards or other work pieces when clamped against it by the vise.

Figure 4:
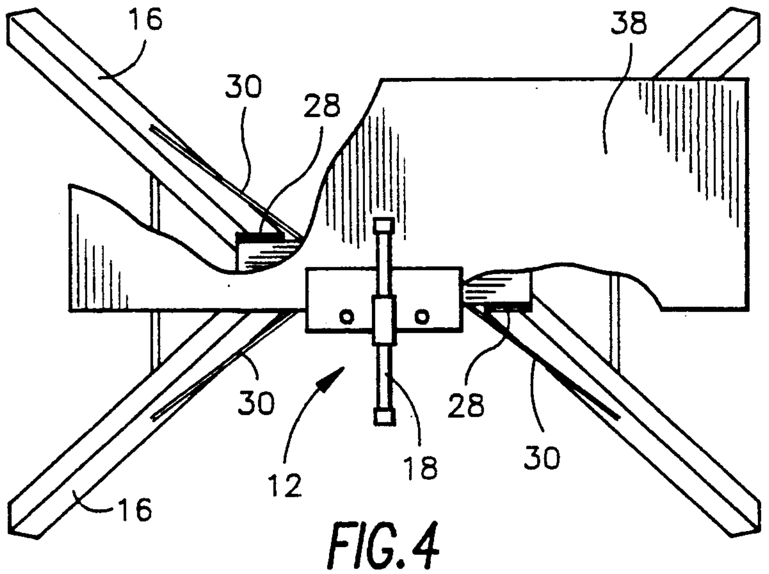
FIG. 4 is a top plan view of the sawhorse support and vise with a board work piece, shown partially broken away, being held and supported by the vise.

Leg members 16 are each hingedly and pivotally attached to support member 14 at the corners thereof. Hinge elements 22, which are of the standard type, are connected to a respective outside corner of support member 14 and to a leg member 16. The bottom flap 24 of hinge 22 is provided with the conventional holes used for screwing the hinge to the hinged object. In the instant invention, the leg members 16 are fixedly connected, by screwing or other means, to bottom flap 24 at a single point of attachment through hole 26. This enables leg member 16 to pivot in the plane of flap 24 of hinge 22. As leg member 16 is swung out away from the vertical perpendicular plane of support member 14, hole 28 comes into alignment with a hole provided in a top portion of leg member 16, as best seen in FIG. 4. Leg member 16 may therefore be held in a splayed out position- upon bolting or otherwise securing leg member at hole 128. This connection may be made permanent if so desired through bolts in two or more holes in the bottom hinge plate to the top of the leg.

Figure 2:
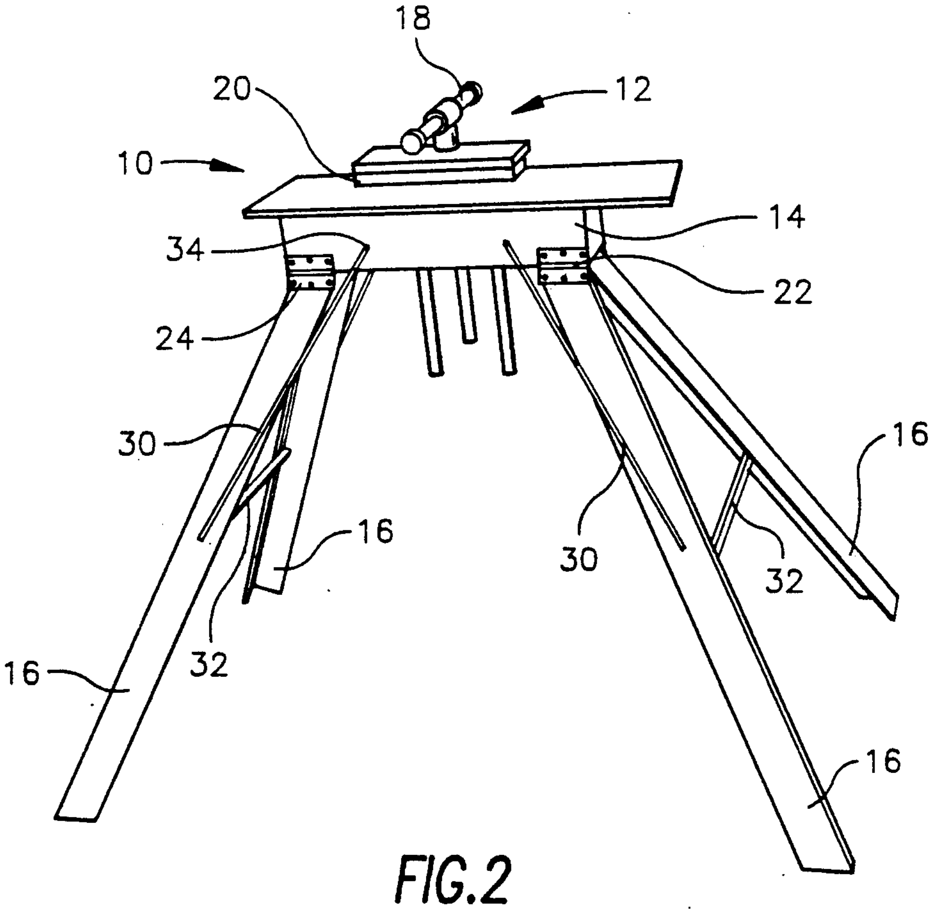
FIG. 2 is a perspective view from the front of the sawhorse support.
Figure 5:
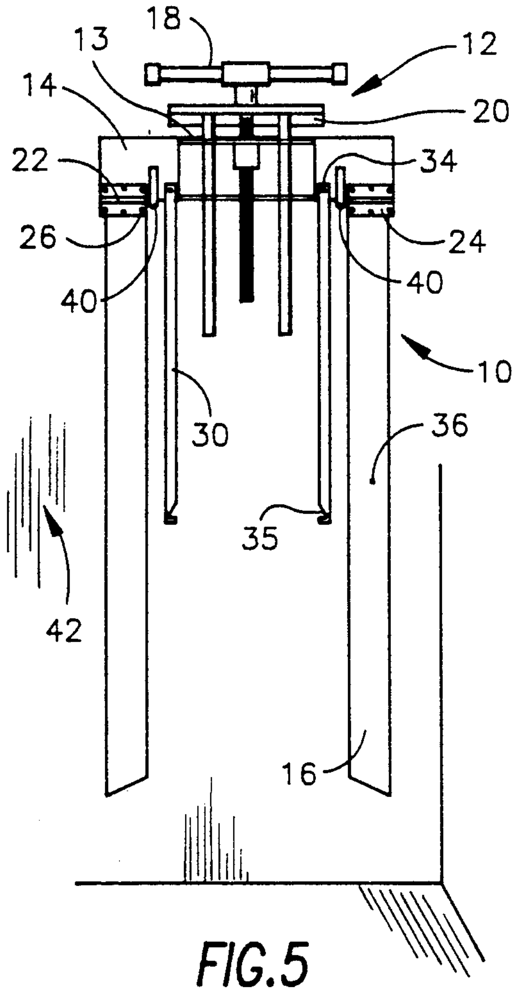
FIG. 5 is a view in side elevation from the rear of the sawhorse support, showing the sawhorse support being suspended from wall hooks in the storage mode.
Figure 3:
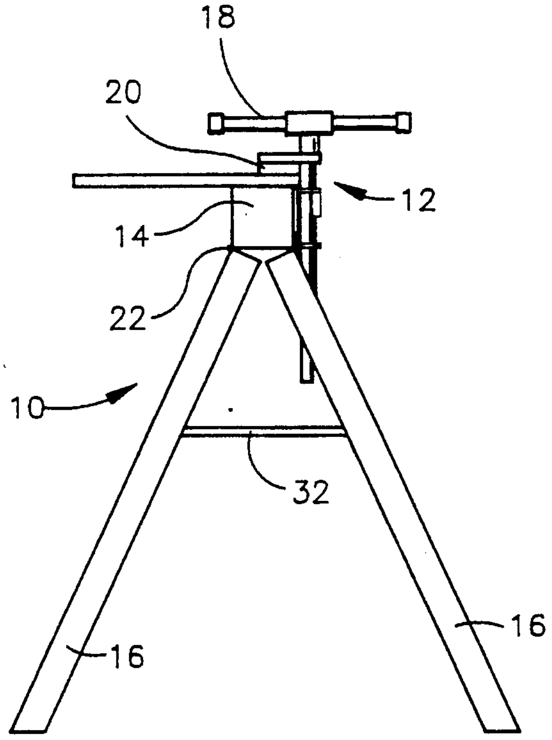
FIG. 3 is a view in side elevation from the right side of the sawhorse support.

Cross braces 30 and 32, as seen in FIG. 2, are employed to provide stability to leg members 16 when the invention is erected. The braces may be of strap metal, or where used simply to prevent spreading apart, may be chain or light flexible cable. Cross braces 30 ar pivotally connected at one end to the cross support member 14 and have at their other end a detent or notch 35, as shown in FIG. 5, by which to engage knob, or stud 36 provided on leg member 16 when erected. When the sawhorse of the invention is broken down, cross braces are disengaged from studs 36 and allowed to pivot about their attachment at 34 so that they hang down as shown in FIG. 5. Cross braces 32 have a similar means of connection (not shown), but span between the legs as shown in FIG. 2.

USE

The horizontal vise with folding sawhorse support of the instant invention is very simply employed to provide a portable work table which enables one to support and work on a large, flat work piece such as a wide board 38, as seen in FIGS. 1 and 4. Props may be used as desired for wide or long boards or sheets extending a distance beyond the vise, as will be readily understood. Vise 12 holds work piece 38 in the horizontal plane, making it more accessible for sawing and other jobs.

The sawhorse support !0 is easily erected by pivoting leg members 16 out and away from support member 14 in a splayed manner. The legs are locked in position by connection of the legs to cross braces 30 which span from support member 14 to a leg at stud 36, and cross braces 32. Further support for the legs may be provided by connecting the legs by a bolt or the like at hole 28 to hinge flap 22.

Sawhorse support 10 is easily collapsed by the reversal of the above steps. Leg members !6 and cross braces 30 and 32 pivot down in resting position, reducing the overall size in both length and width to a substantially flat configuration thus making it suitable for storage on a wall as shown in FIG. 5. Support member 14 may be suspended on wall hooks 40, and the entire sawhorse support 10 rests flat against wall 42.

Various changes and modifications may be made within this invention as will be apparent to those skilled in the art. Such changes and modifications are within the scope and teaching of this invention as defined in the claims appended hereto.

What is claimed is:

1. A portable sawhorse vise, said sawhorse having a vise mounted thereon, said sawhorse being comprised of an elongated top support member, four leg members, four brace members, and two end brace members, each of said leg members being hingedly connected to said top support member at an end thereof whereby each of said leg members are pivotable in a plane transverse to and in a plane co-directional with a longitudinal axis of said top support member, each of said brace members being removably connected between one of said leg members and said top support member to provide support to said leg members, each of said end brace members being removably connected between a pair of said leg members for support at each end of said top support member, whereby said leg members may be pivoted inward upon disconnection of said brace members for collapsing of said sawhorse for storage, said vise being mounted upon said top support member such that a top portion of said vise having a broad clamp face moves vertically relative to the horizontal plane and with respect to said top support member, whereby an article to be worked on may be held securely in a horizontal position upon said top support member.

2. The portable sawhorse vise of claim 1 in which each of said leg members has a stud to receive an end of one of said brace members for connection of said brace members, said end having means for engaging said stud, whereby said brace members may be easily disconnected by disengagement of said brace member from said stud.

3. The portable sawhorse vise of claim 1 in which said legs have hinge means for pivotally connecting them to said support member between a collapsed substantially flat position to an erected splayed support position.

4. The portable sawhorse vise of claim 3 in which said legs have means pivotally connecting said legs to said hinge means to enable said legs to pivot and lie substantially vertically and parallel to each other and in parallel planes when in said collapsed substantially flat position.

5. The portable sawhorse of claim 3 in which said legs are fixedly connected to a portion of said hinge means and are collapsible to said substantially flat position with said legs in said splayed position.

6. The portable sawhorse vise of claim 1 in which said top support member is comprised of a beam having a wide horizontal top surface which serves as a rest for a workpiece such as a wide board and said vise is connected to a side of said beam leaving the top surface of said beam free and unobstructed to receive said workpiece and function as a fixed lower clamp face of said vise.

7. A portable sawhorse vise, said sawhorse having a vise mounted thereon, said sawhorse being comprised of an elongated top support member, four leg members, each of said leg members being connected to said top support member at an end thereof whereby each of said leg members are pivotable in a plane transverse to and in a plane co-directional with a longitudinal axis of said top support member, said vise being mounted upon said top support member such that a top portion of said vise having a clamp face moves vertically relative to the horizontal plane and with respect to said top support member, whereby an article to be worked on may be held securely in a horizontal position upon said top support member, said top support member being comprised of a beam having a wide horizontal top surface which serves as a rest for a workpiece such as a wide board and said vise being connected to a side of said beam leaving the top surface of said beam free and unobstructed to receive said workpiece and function as a fixed lower clamp face of said vise.

8. A portable sawhorse vise, said sawhorse having a vise mounted thereon, said sawhorse being comprised of an elongated top support member, four leg members, and at least two brace members, each of said leg members being hingedly connected to said top support member at an end thereof, each of said brace members being reliably consented between a pair of said leg members for support at each end of said top support member, whereby said leg members may be pivoted inward upon disconnection of said brace members for collaring of said sawhorse for storage, said vise being mounted upon said top support member such that a top portion of said vise having a broad clamp face moves vertically relative to the horizontal plane and with respect to said top support member, whereby an article to be worked on may be held securely in a horizontal position upon said top support member, said legs having hinge means for pivotally connecting them to said support member between a collapsed substantially flat position to an erected splayed support position, said top support member being comprised of a beam having a wide horizontal top surface which serves as a rest for a workpiece such as a wide board and said vise is connected to a side of said beam leaving the top surface of said beam free and unobstructed to receive said workpiece and function as a fixed lower clamp face of said vise.

* * * * *

UNITED STATES PATENT AND TRADEMARK OFFICE

CERTIFICATE OF CORRECTION

PATENT NO. : 5,092,570

DATED : March 3, 1992

INVENTOR(S) : James W. Depping

It is certified that error appears in the above-identified patent and that said Letters Patent is hereby corrected as shown below:

Column 4:

Claim 4, line 3, "3" should be -- 8 --.

Claim 8, line 47, "reliably consented" should be -- removably connected --;

line 50, "collaring" should be -- collapsing --.

Signed and Sealed this

Fourth Day of May, 1993

Attest:

MICHAEL K. KIRK

Attesting Officer

Acting Commissioner of Patents and Trademarks